United States Patent
Fukawatase et al.

(10) Patent No.: US 9,321,421 B2
(45) Date of Patent: Apr. 26, 2016

(54) DRIVER SEAT AIRBAG SYSTEM

(71) Applicant: Toyota Jidosha Kabushiki Kaisha, Toyota-shi, Aichi-ken (JP)

(72) Inventors: Osamu Fukawatase, Miyoshi (JP); Hiroyuki Taguchi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/314,655

(22) Filed: Jun. 25, 2014

(65) Prior Publication Data
US 2014/0375035 A1  Dec. 25, 2014

(30) Foreign Application Priority Data
Jun. 25, 2013 (JP) .................. 2013-132669

(51) Int. Cl.
*B60R 21/16* (2006.01)
*B60R 21/231* (2011.01)
*B60R 21/00* (2006.01)

(52) U.S. Cl.
CPC ....... *B60R 21/231* (2013.01); *B60R 2021/0009* (2013.01); *B60R 2021/0023* (2013.01)

(58) Field of Classification Search
USPC .................... 280/731, 743.1, 743.2
See application file for complete search history.

(56) References Cited

U.S. PATENT DOCUMENTS

| | | | |
|---|---|---|---|
| 3,752,501 A * | 8/1973 | Daniel et al. ............... | 280/729 |
| 5,253,892 A | 10/1993 | Satoh | |
| 5,529,337 A | 6/1996 | Takeda et al. | |
| 5,605,350 A * | 2/1997 | Bates et al. ............... | 280/743.1 |
| 6,142,510 A * | 11/2000 | Endo et al. ............... | 280/731 |
| 6,672,614 B2 * | 1/2004 | Endo et al. ............... | 280/731 |
| 7,090,248 B2 * | 8/2006 | Jenkins et al. ............ | 280/743.1 |
| 8,789,847 B2 * | 7/2014 | Nagasawa et al. ......... | 280/731 |
| 2002/0113418 A1 * | 8/2002 | Endo et al. ............... | 280/731 |
| 2003/0116945 A1 | 6/2003 | Abe | |
| 2005/0184489 A1 * | 8/2005 | Kobayashi ................. | 280/729 |
| 2005/0269807 A1 * | 12/2005 | Jenkins et al. ............ | 280/731 |
| 2006/0113776 A1 | 6/2006 | Iida et al. | |

FOREIGN PATENT DOCUMENTS

| | | |
|---|---|---|
| JP | 04-009349 U | 1/1992 |
| JP | 05-155300 A | 6/1993 |
| JP | 07-156733 A | 6/1995 |
| JP | 07-156740 A | 6/1995 |
| JP | 11-245759 A | 9/1999 |
| JP | 2000-038106 A | 2/2000 |
| JP | 2002-308039 A | 10/2002 |
| JP | 2003-182500 A | 7/2003 |
| JP | 2006-151265 A | 6/2006 |
| JP | 2007-203820 A | 8/2007 |
| JP | 2008-094224 A | 4/2008 |

* cited by examiner

*Primary Examiner* — Toan To
(74) *Attorney, Agent, or Firm* — Dinsmore & Shohl LLP

(57) ABSTRACT

A driver seat airbag system includes: an airbag that is housed in a pad section of a steering wheel, receives a supply of gas for inflation during a collision of a vehicle, and is inflated and deployed between the steering wheel and an occupant in a driver seat; and an inflator that generates the gas. The airbag includes an auxiliary inflated section that is inflated to a front of the vehicle in conjunction with inflation and deployment of the airbag, so as to enter a space between a rim and a spoke of the steering wheel.

8 Claims, 5 Drawing Sheets

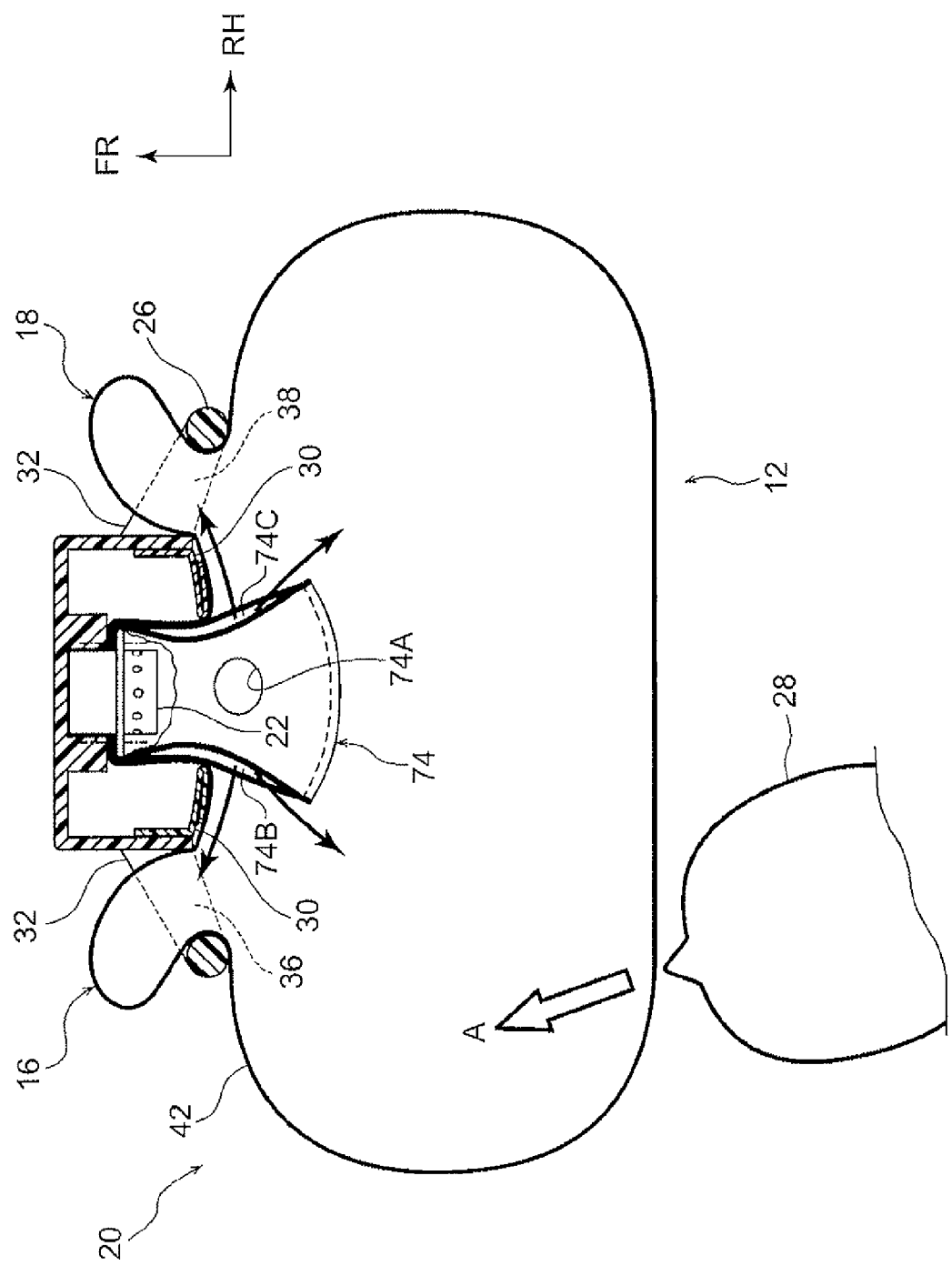

DRIVER SEAT AIRBAG SYSTEM

INCORPORATION BY REFERENCE

The disclosure of Japanese Patent Application No. 2013-132669 filed on Jun. 25, 2013 including the specification, drawings and abstract is incorporated herein by reference in its entirety.

BACKGROUND OF THE INVENTION

1. Field of the Invention

The present invention relates to a driver seat airbag system.

2. Description of Related Art

A driver seat airbag system in which a position of a connected section of a tether to a base cloth on an opposite side of an occupant is aligned with an arrangement position of a rim of a steering wheel (see Japanese Patent Application Publication No, 2008-94224 (JP 2008-94224 A)) has been disclosed. The position of the connected section of the tether to a base cloth on an occupant side is set as a position substantially opposed to the arrangement position of the rim or is set on the outside of the position in a radial direction. In addition, a portion of the base cloth on the opposite side of the occupant that overlaps with the rim is provided with an additional sewn section over a circumferential direction or at least in a lower part in the circumferential direction. A sewing thread with a lower stretch rate than a sewing thread used for the base cloth on the occupant side is used for the additional sewn section.

During a frontal collision (a small overlap collision) or during an oblique collision on the outside of a front side member in a vehicle width direction with a passenger seat side of a vehicle being a collision side, an occupant in a driver seat positioned opposite from the collision side intends to move obliquely in a vehicle traveling direction (to a center side in the vehicle width direction), that is, to a collision direction.

Such a collision mode is not considered in the above example. Thus, it is considered that, when the occupant in the driver seat obliquely abuts against an airbag, the airbag turns about a pad section of the steering wheel as an attachment point thereof to the outside in the vehicle width direction and is then removed from the steering wheel.

SUMMARY OF THE INVENTION

The present invention provides a driver seat airbag system in which restraint performance of an occupant in a driver seat by an airbag during a small overlap collision or during an oblique collision is improved.

A first aspect of the present invention relates to the driver seat airbag system. The driver seat airbag system includes: an airbag that is housed in a pad section of a steering wheel, receives a supply of gas for inflation during a collision of a vehicle, and is inflated and deployed between the steering wheel and an occupant in a driver seat; and an inflator that generates the gas. The airbag includes an auxiliary inflated section that is inflated to a front of the vehicle in conjunction with inflation and deployment of the airbag, so as to enter a space between a rim and a spoke of the steering wheel.

In the above aspect, in conjunction with the inflation and deployment of the airbag during the collision of the vehicle, the auxiliary inflated section of the airbag enters the space between the rim and the spoke of the steering wheel and is inflated. Thus, even when the occupant in the driver seat abuts against the airbag obliquely during the small overlap collision or during the oblique collision, and a large force in a vehicle width direction is applied to the airbag, the auxiliary inflated section is caught by the rim. Accordingly, the airbag is less likely to turn in a vehicle width direction, and is less likely to be removed from the steering wheel. Therefore, it is possible to improve restraint performance of the occupant in the driver seat by the airbag during the small overlap collision and during the oblique collision.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a cross-sectional view according to a second embodiment that corresponds to a cross-sectional position in FIG. 4 and shows a state in which the occupant in the driver seat abuts against the airbag that is inflated and deployed.

DETAILED DESCRIPTION OF EMBODIMENTS

A description will hereinafter be made on embodiments of the present invention on the basis of the drawings.

First Embodiment

Figure 1:
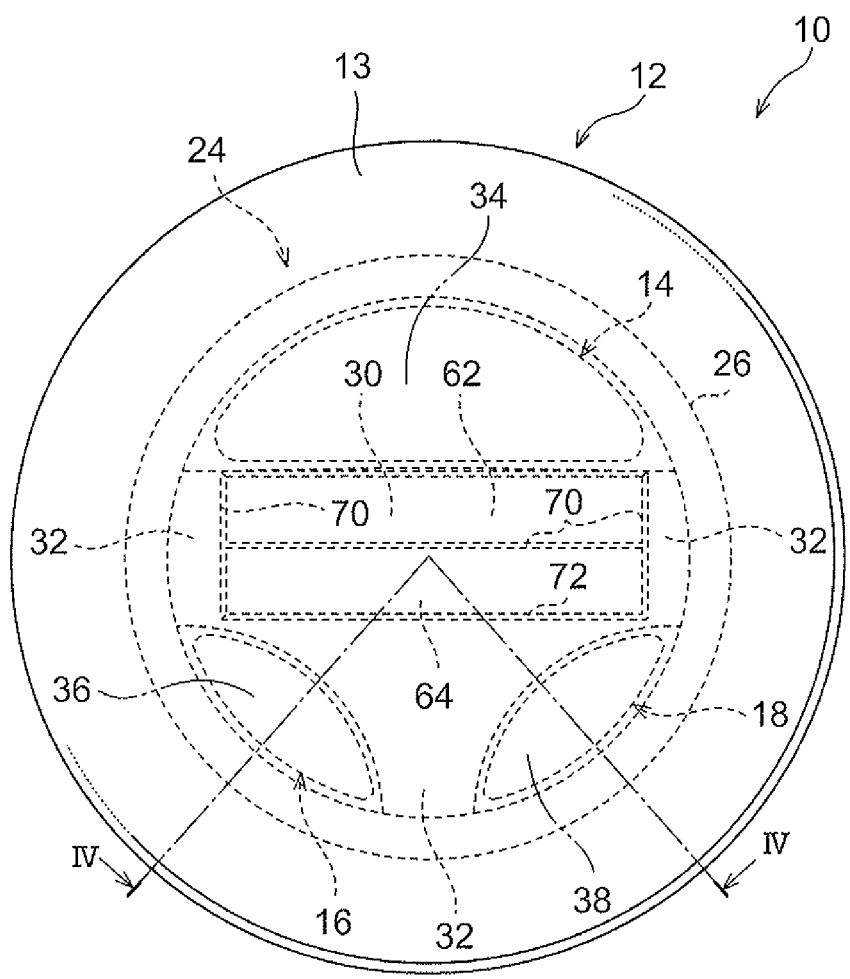
FIG. 1 is a front view according to a first embodiment in which an inflated and deployed state of an airbag is seen from the rear of a vehicle.

In FIG. 1, a driver seat airbag system 10 according to this embodiment includes an airbag 12 and an inflator 22, and the airbag 12 includes sub bags 14, 16, 18 that each serves as an example of an auxiliary inflated section.

The airbag 12 is configured to be housed in a pad section 30 of a steering wheel 24, receive a supply of gas for inflation from the inflator 22, for example, and be inflated and deployed between the steering wheel 24 and an occupant in a driver seat 28 (FIG. 4) during a collision of a vehicle. The airbag 12 is inflated and deployed in a substantially circular shape, for example, in a concentric manner with a rim 26 of the steering wheel 24. An outer diameter of the airbag 12 in this state is set to be larger than an outer diameter of the rim 26 of the steering wheel 24. The outer diameter of the rim 26 does not refer to a thickness of the rim 26 but refers to the outer diameter thereof when the steering wheel 24 is seen from front.

Spaces 34, 36, 38 are formed between the rim 26 and a spoke 32 of the steering wheel 24. The spoke 32 is a portion that connects between the rim 26 and the pad section 30 that is located in a center section of the steering wheel 24, and is provided at three positions, for example.

Figure 4:
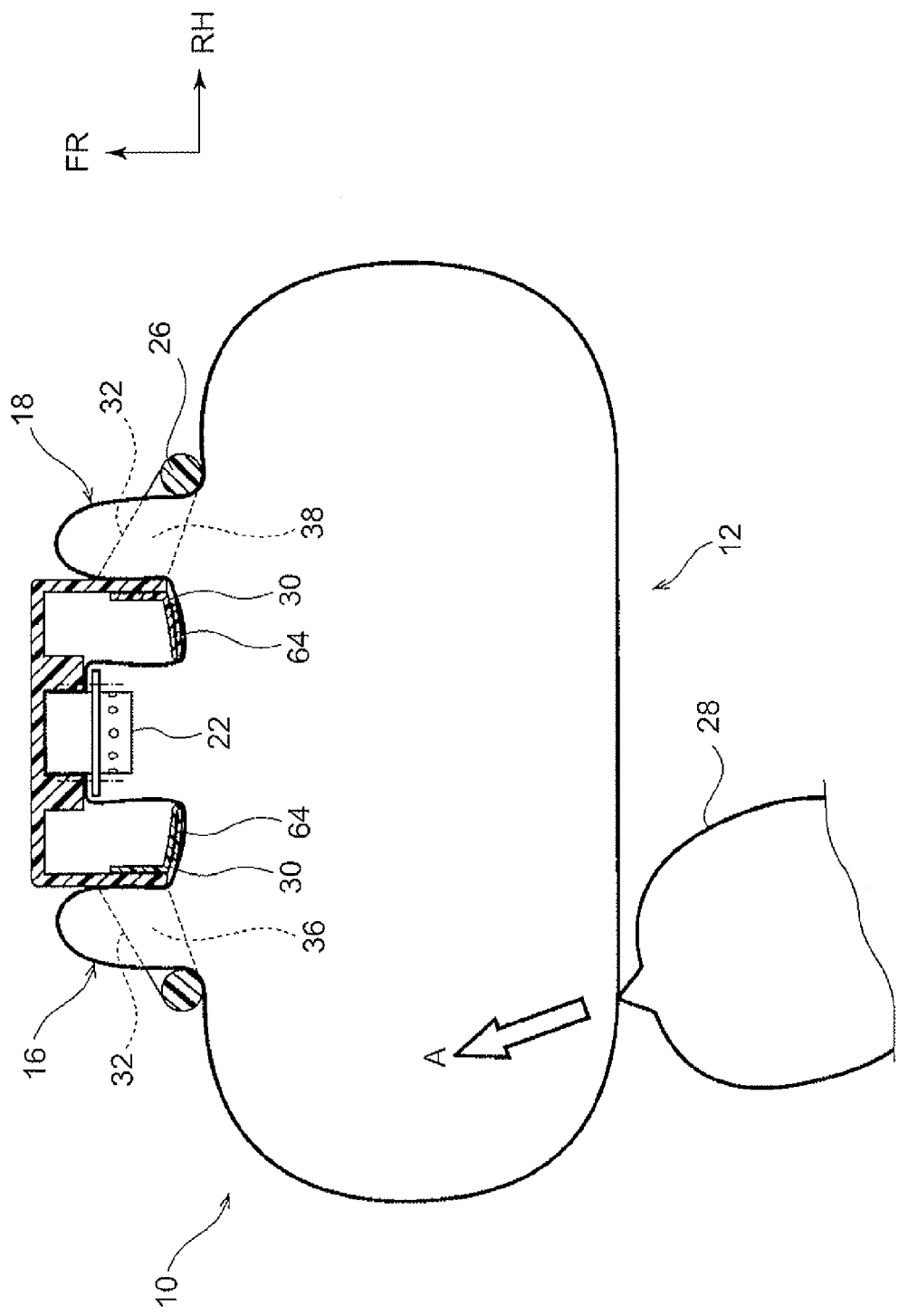
FIG. 4 is a cross-sectional view according to the first embodiment that is taken along the line IV-IV in FIG. 1 and shows a state in which an occupant in a driver seat abuts against the airbag that is inflated and deployed.

The sub bags 14, 16, 18 are portions that are inflated to the front of the vehicle in conjunction with the inflation and deployment of the airbag 12 so as to respectively enter the spaces 34, 36, 38 of the steering wheel 24 (sec also FIG. 4). The sub bags 14, 16, 18 are inflated sections that are added to the airbag 12. In other words, the airbag 12 includes a general section 13 that is inflated and deployed in a substantially circular shape and the sub bags 14, 16, 18. While the general section 13 is a portion that directly restrains the occupant in the driver seat 28, the sub bags 14, 16, 18 are not portions that directly restrain the occupant in the driver seat 28. These sub bags 14, 16, 18 respectively correspond to the spaces 34, 36, 38 at three positions, for example. Thus, the sub bags 14, 16, 18 are provided at three positions. Just as described, the plural sub bags are preferably provided in the circumferential direction of the steering wheel 24.

Figure 2A:
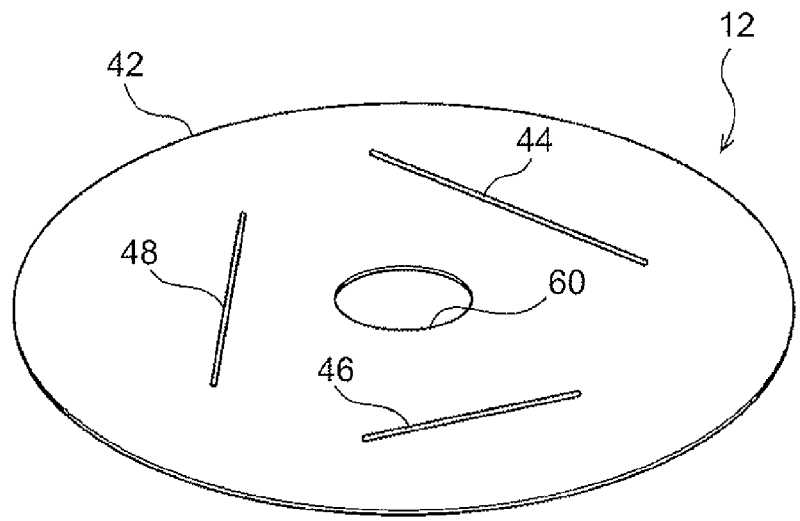
FIG. 2A is a perspective view according to the first embodiment for showing a base cloth on an opposite side of an occupant of the airbag.
Figure 2B:
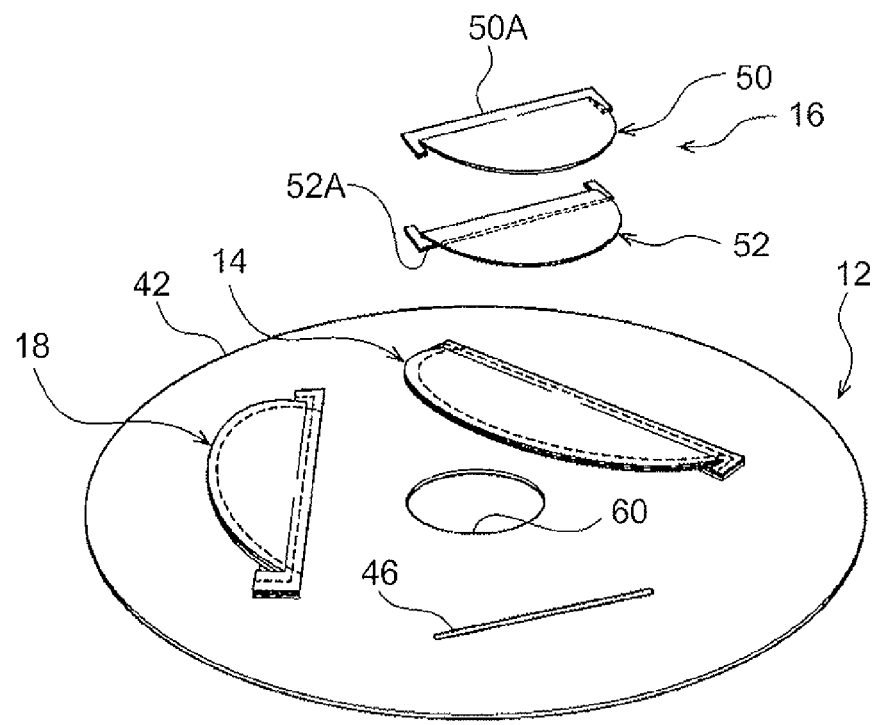
FIG. 2B is a partially exploded perspective view according to the first embodiment for showing a state that a sub bag is attached to an opening of the base cloth on the opposite side of the occupant.

In FIG. 2A, of base cloths that constitute the airbag 12, a base cloth that is located in a front side of the vehicle (a base cloth on an opposite side of an occupant 42) is formed with openings 44, 46, 48 in slit shapes. The sub bags 14, 16, 18 are communicated with the airbag 12 through the openings 44, 46, 48, respectively. As shown in FIG. 2B, the sub bag 16 is formed in a bag shape to be opened in one direction by sewing a pair of base cloths 50, 52 in substantially semicircular shapes, for example. Edges 50A, 52A that are provided on an opening side are sewn around the opening 46 in the base cloth on the opposite side of the occupant 42. Thus, shapes of the base cloths 50, 52 are set such that the sub bag 16 fills the space 36 (FIG. 1, FIG. 4) of the steering wheel 24 during the inflation of the sub bag 16. The same applies to the configurations of the sub bags 14, 18. A through hole 60 through which the inflator 22 (FIG. 4) passes through is formed in the center section of the base cloth on the opposite side of the occupant 42.

Figure 3:
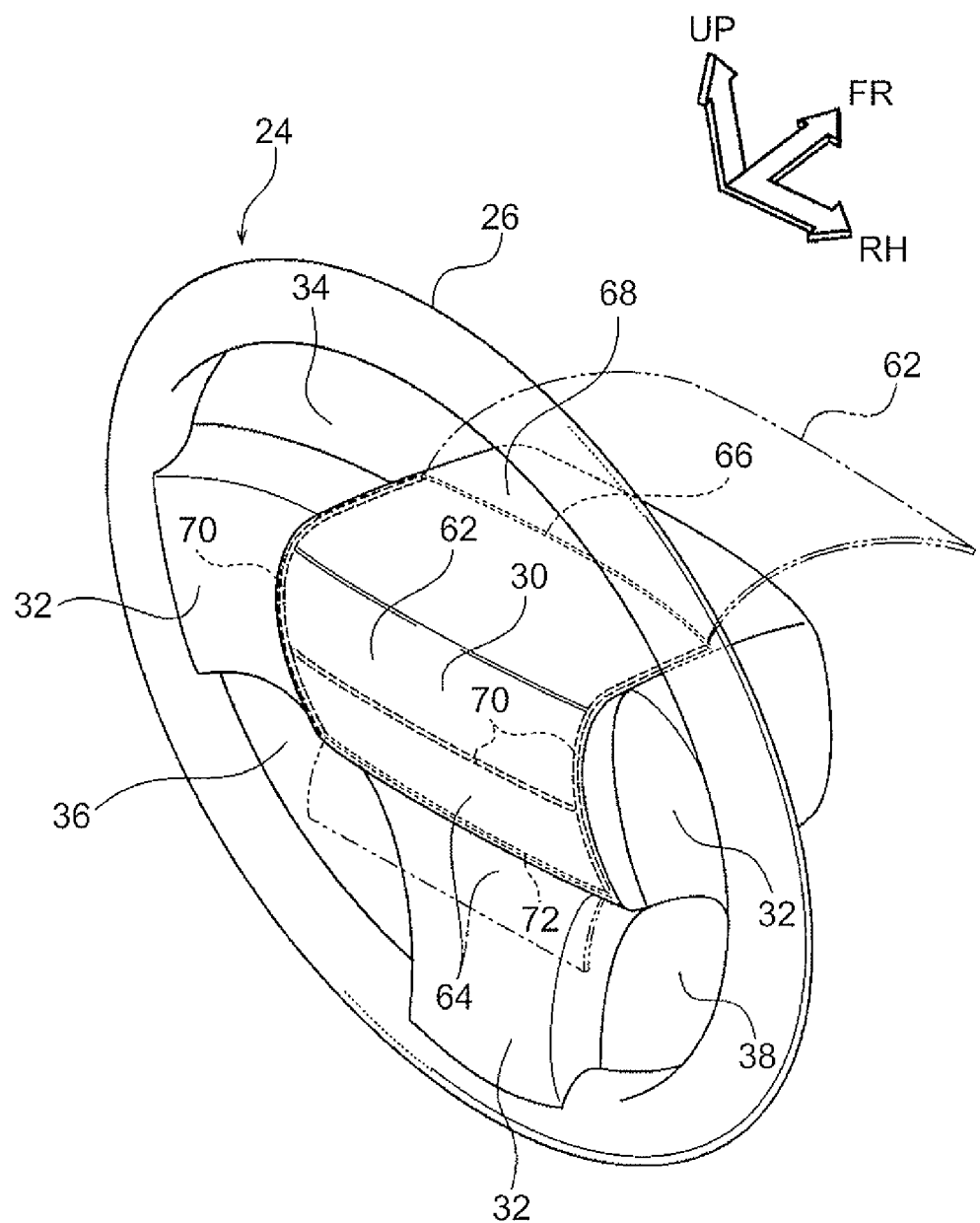
FIG. 3 is a perspective view according to the first embodiment for showing a deployed state of a lid that is provided in a pad section of a steering wheel.

In FIG. 1 and FIG. 3, the pad section 30 of the steering wheel 24 is provided with, for example, upper and lower lids 62, 64 that are deployed during the inflation and deployment of the airbag 12. In addition, the pad section 30 is provided with a rupture expected section 70 that is along the lids 62, 64. As shown in FIG. 3, a hinge section 66 of the lid 62 is provided in a peripheral wall 68 in the front side of the vehicle from a rear surface of the pad section 30. A position of the hinge section 66 is a 12 o'clock position when the steering wheel 24 is in a neutral position, and corresponds to the largest space 34 of the spaces 34, 36, 38 of the steering wheel 24. Since the position of the hinge section 66 is set as described above, the sub bag 14 can deeply enter the space 34.

The lid 64 is deployed downward of the vehicle with a hinge section 72 that is provided at a lower end of the rear surface of the pad section 30 being a center. The lid 64 is desirably deployed so as not to cover the spaces 36, 38 of the steering wheel 24.

(Operations)

This embodiment is configured as above, and operations thereof will hereinafter be described. In FIG. 4, in the driver seat airbag system 10 according to this embodiment, the inflator 22 spews the gas for inflation during the collision of the vehicle, and this gas is supplied to the airbag 12. Accordingly, the airbag 12 is inflated and deployed between the steering wheel 24 and the occupant in the driver seat 28. In conjunction with this, the sub bags 14, 16, 18 that are provided in the airbag 12 respectively enter the spaces 34, 36, 38 between the rim 26 and the spoke 32 of the steering wheel 24 and are inflated (FIG. 1).

As shown in FIG. 3, during the inflation and deployment of the airbag 12, the lid 62 of the pad section 30 is deployed with the hinge section 66, which is located in the front side of the vehicle from the rear surface of the pad section 30, being the center. Thus, compared to a case where the lid 62 is deployed in the rear surface of the pad section 30, the sub bag 14 is more likely to be deployed to the front of the vehicle. Accordingly, the sub bag 14 can further deeply enter the space 34 of the steering wheel 24.

More specifically, during the inflation and deployment of the airbag 12, the gas is respectively supplied from the openings 44, 46, 48 in the base cloth on the opposite side of the occupant 42 to the sub bags 14, 16, 18. Accordingly, the sub bags 14, 16, 18 (FIGS. 2A, B) respectively enter the spaces 34, 36, 38 of the steering wheel 24 and are inflated.

When the occupant (head) in the driver seat 28 abuts against the airbag 12 obliquely (in an arrow A direction) during the small overlap collision or during the oblique collision, a force in the vehicle width direction is applied to the airbag 12. This force in the vehicle width direction is likely to become large when a position at which the occupant (head) in the driver seat 28 abuts against the airbag 12 is on the outside of the rim 26 of the steering wheel 24. In this embodiment, since the sub bags 14, 16, 18 are caught by the rim 26 even in such a case, the airbag 12 is less likely to turn in the vehicle width direction. Thus, the airbag 12 is less likely to be removed from the steering wheel 24.

In addition, in this embodiment, since the sub bags 14, 16, 18 (FIG. 2B) are provided as the inflated sections, the sub bags 14, 16, 18 can easily enter the spaces 34, 36, 38 of the steering wheel 24, respectively. Accordingly, it is possible to effectively inhibit removal of the steering wheel 24 from the airbag 12 during the small overlap collision and during the oblique collision.

Furthermore, the plural sub bags 14, 16, 18 are provided in the circumferential direction of the steering wheel 24. Thus, even when the further larger force in the vehicle width direction is applied to the airbag 12, the removal of the airbag 12 from the steering wheel 24 is inhibited. Since the sub bags 14, 16, 18 respectively fill all of the spaces 34, 36, 38 of the steering wheel 24, the removal of the airbag 12 from the steering wheel 24 can be inhibited without depending on a turning angle of the steering wheel 24 and regardless of a direction in which the force is applied to the airbag 12. Therefore, the position of the airbag 12 can be stabilized.

As described above, according to this embodiment, restraint performance of the occupant in the driver seat 28 by the airbag 12 during the small overlap collision and during the oblique collision can be improved.

Second Embodiment

In FIG. 5, in a driver seat airbag system 20 according to this embodiment, the sub bags 14 (see FIG. 1), 16, 18 are inflated on the outside in the radial direction of the rim 26 in the front side of the vehicle. In a cross-sectional position in FIG. 5, as for a length of the base cloth from a tip to a base (the base cloth on the opposite side of the occupant 42) of each of the sub bags 16, 18, the base cloth on the inside in the radial direction of the steering wheel 24 is desirably set longer than the base cloth on the outside in the radial direction. The same applied to a length of the base cloth for the sub bag 14. In this embodiment, the inflator 22 is provided with a rectifying cloth 74, and the rectifying cloth 74 controls a supply direction of the gas to the sub bags 14, 16, 18. The rectifying cloth 74 is, for example, formed by sewing the base cloth in a cylindrical body, and has openings 74A, 74B, 74C that are respectively opened to the sub bags 14, 16, 18. Of the openings, the openings 74B, 74C are the openings at both ends of the cylindrical body, and the opening 74A is a through hole that is provided on a side of the cylindrical body. The openings 74B, 74C function to supply the gas to a main body of the airbag 12.

Since the other components are same as those of the first embodiment, the same components are denoted by the same reference numerals in the drawing, and the description thereof will not be repeated.

(Operations)

This embodiment is configured as described above, and the operations thereof will hereinafter be described. In FIG. 5, in the driver seat airbag system 20 according to this embodiment, the supply direction of the gas is controlled by the rectifying cloth 74 during the inflation and deployment of the airbag 12. Accordingly, the sub bags 14 (see FIG. 1), 16, 18 are inflated to the outside in the radial direction of the rim 26 in the front side of the vehicle, and the sub bags 14, 16, 18 are caught by the rim 26 in a hooked state. Thus, even when the occupant (head) in the driver seat 28 abuts against the airbag 12 obliquely (in the arrow A direction) during the small overlap collision or during the oblique collision, and the large force in the vehicle width direction is applied to the airbag 12, the removal of the airbag 12 from the steering wheel 24 is inhibited. This removal inhibiting effect of the airbag 12 is larger in this embodiment than in the first embodiment. Therefore, it is possible to further stable the position of the airbag 12 and thus to improve the restraint performance of the occupant in the driver seat 28.

Another Embodiment

The number of the sub bags 14, 16, 18 are not limited to three, but may be one, two, four or more. The plural sub bags may be provided in a single space.

The auxiliary inflated sections are not limited to the sub bags 14, 16, 18, and may adopt a configuration in which a portion of the airbag 12 consequently serves as the auxiliary inflated section during the inflation and deployment. The airbag 12 and the auxiliary inflated section may integrally be formed by double-weaving.

In FIG. 3, the hinge section 66 of the lid 62 is provided in the peripheral wall 68 in the front side of the vehicle from the rear surface of the pad section 30; however, the position of the hinge section 66 is not limited thereto. The hinge section 66 may be located in the rear surface of the pad section 30.

The configuration of the rectifying cloth 74 according to the second embodiment is merely an example, and thus can appropriately be changed. A configuration may be adopted in which the rectifying cloth 74 is not used.

What is claimed is:

1. A driver seat airbag system comprising:
   an airbag that is housed in a pad section of a steering wheel having a rim and a spoke, the airbag receives a supply of gas for inflation during a collision of a vehicle, and the airbag is inflated and deployed between the steering wheel and an occupant in a driver seat, in the inflated and deployed state an outer diameter of the airbag is larger than an outer diameter of the rim of the steering wheel; and
   an inflator that generates the gas, wherein
   the airbag includes a plurality of auxiliary inflated sections that are inflated to a front of the vehicle in conjunction with inflation and deployment of the airbag, each of the plurality of auxiliary inflated sections are provided on the airbag at positions corresponding to spaces between the rim and the spoke of the steering wheel so as to enter the spaces between the rim and the spoke of the steering wheel, the plurality of auxiliary inflated sections are provided in a circumferential direction of the steering wheel, wherein
   of base cloths that constitute the airbag, a plurality of openings are formed in a base cloth that is located in a front side of the vehicle, and
   each of the plurality of auxiliary inflated sections is a sub bag, wherein the plurality of auxiliary inflated sections are in communication with the airbag through the plurality of openings, respectively.

2. The driver seat airbag system according to claim 1, wherein
   the plural auxiliary inflated sections are provided to fill all spaces between the rim and the spoke of the steering wheel.

3. The driver seat airbag system according to claim 1, further comprising:
   a lid that is provided in the pad section and is deployed during the inflation and deployment of the airbag, wherein
   a hinge section of the lid is provided in a peripheral wall in a front side of the vehicle from a rear surface of the pad section.

4. The driver seat airbag system according to claim 1, wherein
   the plurality of openings are formed having slit shapes,
   each of the plurality of auxiliary inflated sections are formed in a bag shape to be opened in one direction by sewing a pair of base cloths in substantially semicircular shapes.

5. The driver seat airbag system according to claim 1, wherein
   the inflator is provided with a rectifying cloth,
   the rectifying cloth controls a supply direction of the gas to the auxiliary inflated sections,
   the rectifying cloth is formed by sewing a base cloth in a cylindrical body, and the rectifying cloth has openings that are respectively opened to the auxiliary inflated sections.

6. The driver seat airbag system according to claim 1, wherein
   each of the plurality of auxiliary inflated sections is formed by sewing a separate bag section to a side of the airbag located in a front side of the vehicle.

7. A driver seat airbag system comprising:
   an airbag that is housed in a pad section of a steering wheel having a rim and a spoke, the airbag receives a supply of gas for inflation during a collision of a vehicle, and the airbag is inflated and deployed between the steering wheel and an occupant in a driver seat, in the inflated and deployed state an outer diameter of the airbag is larger than an outer diameter of the rim of the steering wheel; and
   an inflator that generates the gas;
   a lid that is provided in the pad section and is deployed during the inflation and deployment of the airbag, the lid includes a hinge section provided in a peripheral wall in a front side of the vehicle from a rear surface of the pad section, wherein
   the airbag includes a plurality of auxiliary inflated sections that are inflated to a front of the vehicle in conjunction with inflation and deployment of the airbag, each of the plurality of auxiliary inflated sections are provided on the airbag at positions corresponding to spaces between the rim and the spoke of the steering wheel so as to enter the spaces between the rim and the spoke of the steering wheel, the plurality of auxiliary inflated sections are provided in a circumferential direction of the steering wheel.

8. A driver seat airbag system comprising:

an airbag that is housed in a pad section of a steering wheel having a rim and a spoke, the airbag receives a supply of gas for inflation during a collision of a vehicle, and the airbag is inflated and deployed between the steering wheel and an occupant in a driver seat, in the inflated and deployed state an outer diameter of the airbag is larger than an outer diameter of the rim of the steering wheel; and an inflator that generates the gas, wherein the airbag includes a plurality of auxiliary inflated sections that are inflated to a front of the vehicle in conjunction with inflation and deployment of the airbag, each of the plurality of auxiliary inflated sections are provided on the airbag at positions corresponding to spaces between the rim and the spoke of the steering wheel so as to enter the spaces between the rim and the spoke of the steering wheel, the plurality of auxiliary inflated sections are provided in a circumferential direction of the steering wheel, the plurality of auxiliary inflated sections are inflated to the outside in a radial direction of the rim in a front side of the vehicle, wherein of base cloths that constitute the airbag, openings are formed in a base cloth that is located in a front side of the vehicle, and the plurality of auxiliary inflated sections are sub bags that are in communication with the airbag through the openings.

* * * * *